(12) United States Patent
Patil et al.

(10) Patent No.: US 11,046,862 B2
(45) Date of Patent: Jun. 29, 2021

(54) PRINT RECEPTIVE TOPCOAT

(71) Applicant: Avery Dennison Corporation, Glendale, CA (US)

(72) Inventors: Dhananjay Patil, Glendale, CA (US); Shubhangi Hemant Nair, Glendale, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/909,049

(22) Filed: Mar. 1, 2018

(65) Prior Publication Data
US 2018/0251655 A1 Sep. 6, 2018

(30) Foreign Application Priority Data
Mar. 1, 2017 (IN) .............................. 201711007284

(51) Int. Cl.
C09D 133/08 (2006.01)
C09D 133/10 (2006.01)
D21H 19/12 (2006.01)
C09D 133/06 (2006.01)
C09D 133/14 (2006.01)

(52) U.S. Cl.
CPC ........ *C09D 133/08* (2013.01); *C09D 133/066* (2013.01); *C09D 133/10* (2013.01); *C09D 133/14* (2013.01); *D21H 19/12* (2013.01)

(58) Field of Classification Search
None
See application file for complete search history.

(56) References Cited

U.S. PATENT DOCUMENTS

| RE24,906 | E | 12/1960 | Ulrich |
| 2,973,286 | A | 2/1961 | Ulrich |
| 6,063,182 | A | 5/2000 | Babler |
| 6,132,039 | A * | 10/2000 | Nishimura ............... B41M 5/52 347/105 |
| 6,565,951 | B1 | 5/2003 | Sugiyama et al. |
| 6,743,514 | B1 * | 6/2004 | Samaranayake ......... B41M 5/52 428/441 |
| 6,848,777 | B2 | 2/2005 | Chen et al. |
| 6,866,383 | B2 | 3/2005 | Naik et al. |
| 7,279,506 | B2 | 10/2007 | Sisler et al. |
| 7,427,641 | B2 | 9/2008 | Kataoka et al. |
| 7,578,587 | B2 | 8/2009 | Belelie et al. |
| 7,618,693 | B2 | 11/2009 | Dungworth et al. |
| 7,866,811 | B2 | 1/2011 | Seri et al. |
| 7,915,326 | B2 | 3/2011 | Oguchi et al. |
| 8,313,884 | B2 | 11/2012 | Nosella et al. |
| 8,361,557 | B2 | 1/2013 | Jansing et al. |
| 8,519,021 | B2 | 8/2013 | Ohzeki |
| 8,702,219 | B2 | 4/2014 | Vasudevan |
| 8,714,737 | B2 | 5/2014 | Pal et al. |
| 8,741,049 | B2 | 6/2014 | Saito et al. |
| 8,765,852 | B1 | 7/2014 | Swei et al. |
| 8,846,798 | B2 | 7/2014 | Swei et al. |
| 8,987,348 | B2 | 3/2015 | Mukae et al. |
| 9,061,536 | B2 | 6/2015 | Wiegers |
| 9,228,105 | B2 | 1/2016 | Song et al. |
| 9,421,809 | B2 | 8/2016 | Niu et al. |
| 9,475,329 | B2 | 10/2016 | Wingkono et al. |
| 2002/0188070 | A1 * | 12/2002 | Tsuboniwa ........... C09D 5/4473 525/107 |
| 2003/0102217 | A1 * | 6/2003 | Kasahara ............... B05D 7/532 204/507 |
| 2004/0118687 | A1 * | 6/2004 | Muramoto ........... C09D 5/4473 204/487 |
| 2004/0197572 | A1 | 10/2004 | Bell |
| 2004/0209016 | A1 * | 10/2004 | Ishida .................... B41M 5/508 428/32.34 |
| 2007/0116905 | A1 | 5/2007 | Huynh |
| 2008/0118647 | A1 * | 5/2008 | Suzuki ................... B41M 5/508 427/362 |
| 2008/0188599 | A1 * | 8/2008 | Dinescu .................. B41M 5/52 524/169 |
| 2009/0130348 | A1 * | 5/2009 | Yamashita ............... B41M 5/42 428/32.64 |
| 2010/0035026 | A1 * | 2/2010 | Oscar ..................... B32B 33/00 428/195.1 |
| 2010/0159164 | A1 | 6/2010 | Zhang et al. |
| 2013/0236702 | A1 | 9/2013 | Pellerite et al. |
| 2013/0307914 | A1 * | 11/2013 | Chen ..................... C09D 11/40 347/100 |
| 2015/0225586 | A1 | 8/2015 | Ingle et al. |

(Continued)

FOREIGN PATENT DOCUMENTS

| CA | 2372770 | 11/2000 |
| EP | 0812267 | 9/1998 |

(Continued)

OTHER PUBLICATIONS

Shimizu—JP 2000-0238425 A—ISR D#4—MT—Recording sheet for aqeous ink—2000 (Year: 2000).*
Ashland—pvp_va_copolymers_brochure (Year: 2013).*
Melinex 705 Yellow Card _ E93687 (Year: 2019).*
Michelman® Michem® Emulsion 09625 Cationic ethylene acrylic acid emulsion (Year: 2019).*
Gellner Industril—KX-99 datasheet—viscosity, pH,—undated (Year: 2019).*
Higuchi—JP 2016-204691 A—MT—cationic polymer w—hydroxyl value 5-100—2016 (Year: 2016).*

(Continued)

*Primary Examiner* — Callie E Shosho
*Assistant Examiner* — John Vincent Lawler

(57) ABSTRACT

A water based wet topcoat comprising a cationic acrylic polymer is provided. The wet topcoat also water and a binder. The wet topcoat is coated into a substrate and is print receptive to a variety of printing techniques. The substrate may be a label or paper. The topcoat advantageously has strong adhesion to the substrate or paper.

12 Claims, No Drawings

(56) References Cited

U.S. PATENT DOCUMENTS

| | | | |
|---|---|---|---|
| 2015/0322282 A1 | 11/2015 | Matsumoto et al. | |
| 2016/0035563 A1* | 2/2016 | Lin | H01L 21/02057 |
| | | | 156/345.54 |

FOREIGN PATENT DOCUMENTS

| | | | | |
|---|---|---|---|---|
| EP | 0767071 | | 1/2000 | |
| EP | 1180173 | | 6/2004 | |
| EP | 1403343 | | 6/2004 | |
| EP | 1460112 | | 6/2007 | |
| EP | 0902061 | | 12/2007 | |
| EP | 1647414 | | 5/2008 | |
| EP | 1593521 | | 9/2008 | |
| EP | 1819783 | | 10/2009 | |
| EP | 2065446 | | 12/2010 | |
| EP | 1032497 | | 2/2012 | |
| EP | 2376290 | | 6/2013 | |
| EP | 1816171 | | 1/2014 | |
| EP | 2152817 | | 4/2014 | |
| EP | 2535380 | | 6/2014 | |
| EP | 2092001 | | 7/2014 | |
| EP | 2940085 | | 11/2015 | |
| EP | 2343344 | | 3/2018 | |
| EP | 2951026 | | 3/2018 | |
| EP | 3099754 | | 1/2019 | |
| EP | 2732976 | | 2/2019 | |
| EP | 2762534 | | 3/2019 | |
| EP | 2358830 | | 8/2019 | |
| JP | H0761113 A | * | 3/1995 | ............... B41M 5/00 |
| JP | 2000238425 | | 9/2000 | |
| JP | 20000238425 A | * | 9/2000 | ............... B32B 27/00 |
| JP | 2016204691 | * | 12/2016 | ............... C23C 22/07 |
| WO | 2002038382 | | 5/2002 | |
| WO | 03016045 | | 2/2003 | |
| WO | WO2003016045 A1 | * | 2/2003 | ............... B32B 9/06 |
| WO | 2004/063287 | | 7/2004 | |
| WO | 2006/081501 | | 8/2006 | |
| WO | 2007/050763 | | 5/2007 | |
| WO | 2008070029 | | 6/2008 | |
| WO | 2009/146416 | | 12/2009 | |
| WO | 2016/105417 | | 6/2016 | |
| WO | 2016/110711 | | 7/2016 | |

OTHER PUBLICATIONS

Kashiwazaki—JP H07-61113 A—MT—recording medium—cationic polymer & amounts—1995 (Year: 1995).*
International Application No. PCT/US2018/020402, "International Search Report and Written Opinion", dated Jun. 4, 2018, 11 pages.
International Preliminary Report on Patentability dated Sep. 12, 2019 issued in corresponding IA No. PCT/US2018/020402 filed Mar. 1, 2018.

* cited by examiner

PRINT RECEPTIVE TOPCOAT

CROSS-REFERENCE TO RELATED APPLICATION

This application claims priority to Indian Application No. 201711007284, filed on Mar. 1, 2017, the entire contents and disclosures of which are hereby incorporated by reference in their entirety.

FIELD OF THE INVENTION

The present invention relates generally to a print wet topcoat formulation as well as to a dried topcoat formed from the wet topcoat formulation that comprises a cationic acrylic polymer. The topcoat, once dried, may accept print from numerous individual printing platforms and has desirable adhesion, antiblocking, antistatic and processing characteristics.

BACKGROUND OF THE INVENTION

Print receptive topcoats are used in various applications, including wet topcoats for films and papers. Depending on the use of the topcoat, differing printing techniques are used. Non-limiting examples of these techniques include dry toner, liquid toner, UV flexo, WB (water-based) flexo, offset, laser, and HP Indigo. Because of the compositions and methods used for these various printing techniques, the topcoat is often tailored to maximize receptiveness of the topcoat for the specific printing technique, leading to increased manufacturing costs. Additionally, known topcoats suffer from problems with adhesion, antiblocking, and processing.

Various formulations of printable or print receptive topcoats, e.g., for polyolefin and/or other filmic or face materials, are generally known in the art. Although many topcoats are available, they are printable on limited platforms and have adhesion on limited films, and therefore they are not universal topcoats. Additionally, many existing topcoats demand modification to achieve desired performance of processing requirements. These modifications may include external additives, cross-linkers, or other modifiers. For example, U.S. Pub. No. 2004/0197572 discloses a coated sheet in which a coating composition comprises a urethane polymer component, an acrylic polymer component, and a plurality of cross-linkers.

WO 02/38382 discloses a sheet like substrate comprising a substantially non-polar material having coated onto at least one side thereon an anchor coating to aid subsequent coating thereon of a polar coating and/or layer. The anchor coating comprises (a) a polymer comprising an optionally substituted α, β carboxylic acid optionally of high acid value preferably the polymer having a low $T_g$; (b) a polymer comprising an optionally unsubstituted α, β carboxylic acid optionally of low acid value preferably the polymer having a high $T_g$; and (c) a crosslinker, preferably added after a period of time to a mixture of polymers (a) and (b) to crosslink the resultant coating composition and increase the $T_g$ thereof.

U.S. Pat. No. 6,866,383 discloses an ink-receptive composition, comprising: (a) a filler; (b) a binder, comprising a homopolymer, copolymer or terpolymer of a vinyl alcohol, a vinyl acetate, a vinyl chloride or combinations of two or more thereof; (c) at least one quaternary ammonium polymer and (d) at least one hydroxyalkylated polyalkylene-imine, wherein the composition, when coated on a substrate, forms an ink-receptive coating which accepts ink loading greater than about 300%.

US Pub. No. 2007/116905 discloses a thermal transfer image receiving sheet comprising: a substrate sheet supporting an image receiving resinous layer for receiving a transferred image, wherein the image receiving layer is formed by drying an aqueous coating composition. The aqueous coating composition comprises (a) at least one water dispersible aliphatic polyether-polyurethane resin, and at least one water dispersible aliphatic polyester-polyurethane resin, or (b) at least one water dispersible aliphatic polyether-polyurethane resin, a silica dispersion, and an anionic aqueous emulsion of wax; and an aqueous crosslinking agent.

U.S. Pat. No. 9,061,536 discloses a printable or print receptive topcoating for a face material, said topcoating comprising a polyether urethane; a polyurethane acrylate; a crosslinker, wherein the crosslinker comprises an amount in a range of from about 2 parts to about 15 parts based on 100 parts total solids; and an anti-blocking additive, wherein the polyurethane is a water dispersible polyurethane.

None of the above-disclosed references, however, provide for topcoats that are able to accept and retain print from various printing techniques while maintaining adhesiveness to the underlying substrate. In view of the foregoing drawbacks, the need exists for a cost effective topcoat that can accept and retain print from various printing techniques while maintaining adhesiveness to the underlying substrate.

SUMMARY OF THE INVENTION

In an embodiment, the disclosure is directed to a water-based wet topcoat formulation comprising: (i) a cationic acrylic polymer; (ii) a surfactant; (iii) water; and (iv) a binder. The cationic acrylic polymer may be present in an amount from 20 to 80 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The surfactant may be present in an amount from 0.001 to 3 parts by weight, based on a total of 100 parts by weight. Water may be present in an amount from 10 to 60 parts by weight, based on a total of 100 parts by weight. The binder may be present in an amount from 0.1 to 30 parts by weight, based on a total of 100 parts by weight. The wet topcoat may further comprise at least one additive. The at least one additive may be present in an amount from 0.01 to 5 parts by weight, based on a total of 100 parts by weight. The wet topcoat may further comprise at least one additive selected from the group consisting of waxes, defoamers, anti-oxidants, UV stabilizers, fillers, anti-blocking agents, and combinations thereof. In some aspects, the wet topcoat comprises a metal oxide. The wet topcoat may further comprise at least one wax. The wet topcoat may comprise at least one wax present in an amount from 0.1 to 15 parts by weight, based on a total of 100 parts by weight. The wet topcoat may have a surface energy of at least 30 mN/m.

In another embodiment, the disclosure is directed to a dry topcoat comprising: (i) a cationic acrylic polymer; (ii) a surfactant; (iii) a binder, and (iv) additive package. The cationic acrylic polymer may be present in an amount from 50 to 95 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The surfactant may be present in an amount from 0.005 to 3 parts by weight, based on a total of 100 parts by weight. The binder may be present in an amount from 0.1 to 30 parts by weight, based on a total of 100 parts by weight. The topcoat may further comprise at least one additive. The at least one additive may be present in an amount from 0.01 to 10 parts by weight, based on a total of 100 parts by weight. The topcoat may further comprise at least one additive selected from the group consisting of waxes, defoamers, anti-oxidants, UV stabilizers, fillers, anti-blocking agents, and combinations thereof. The topcoat may further comprise at least one wax. In some aspects, the wet topcoat comprises a metal oxide. The topcoat may comprise at least one wax present in an amount from 0.1 to 15 parts by weight, based on a total of 100 parts by weight. The topcoat may have a surface energy of at least 30 mN/m.

In another embodiment, the disclosure is directed to a coated paper comprising: (a) a paper; and (b) a (dry) topcoat. The topcoat may be coated onto the paper in a coat weight from 0.1 to 1.5 gsm. The topcoat may comprise: (i) a cationic acrylic polymer; (ii) a surfactant; and (iii) a binder. The cationic acrylic polymer may be present in an amount from 50 to 95 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The surfactant may be present in an amount from 0.005 to 3 parts by weight, based on a total of 100 parts by weight. The binder may be present in an amount from 0.1 to 30 parts by weight, based on a total of 100 parts by weight. The topcoat may further comprise at least one additive. The at least one additive may be present in an amount from 0.01 to 10 parts by weight, based on a total of 100 parts by weight. The topcoat may further comprise at least one additive selected from the group consisting of waxes, defoamers, anti-oxidants, UV stabilizers, fillers, anti-blocking agents, and combinations thereof. In some aspects, the wet topcoat comprises a metal oxide. The topcoat may further comprise at least one wax. The topcoat may comprise at least one wax present in an amount from 0.1 to 15 parts by weight, based on a total of 100 parts by weight. The topcoat may have a surface energy of at least 30 mN/m.

In yet another embodiment, the disclosure is directed to a label comprising: (a) a substrate; and (b) a topcoat in contact with the substrate. The topcoat may be coated onto the paper in a coat weight from 0.1 to 1.5 gsm. In some aspects, the substrate may comprise a film and a top surface of the film is in contact with the topcoat. The film may be a polyolefin film comprising a material selected from the group consisting of a polyimide, a polyester, a polyetherimide (PEI), a polyethylene naphthalate (PEN), a polyether sulfone (PES), a polysulfone, polymethylpentene (PMP), a polyvinylidene fluoride (PVDF), an ethylene-chlorotrifluoroethylene (ECTFE), or combinations thereof. The substrate may further comprise an adhesive layer, wherein a top surface of the adhesive layer is in contact with a bottom surface of the film. The substrate may further comprise a release liner in contact with a bottom surface of the adhesive layer. The adhesive layer may comprise a pressure sensitive adhesive. The dry topcoat may comprise: (i) a cationic acrylic polymer; (ii) a surfactant; and (iii) a binder. The cationic acrylic polymer may be present in an amount from 50 to 95 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The surfactant may be present in an amount from 0.005 to 3 parts by weight, based on a total of 100 parts by weight. The binder may be present in an amount from 0.1 to 30 parts by weight, based on a total of 100 parts by weight. The topcoat may further comprise at least one additive. The at least one additive may be present in an amount from 0.01 to 10 parts by weight, based on a total of 100 parts by weight. The topcoat may further comprise at least one additive selected from the group consisting of waxes, defoamers, anti-oxidants, UV stabilizers, fillers, anti-blocking agents, and combinations thereof. In some aspects, the wet topcoat comprises a metal oxide. The topcoat may further comprise at least one wax. The topcoat may comprise at least one wax present in an amount from 0.1 to 15 parts by weight, based on a total of 100 parts by weight. The topcoat may have a surface energy of at least 30 mN/m.

In a further embodiment, the disclosure is directed to a water based top coat formulation comprising: a cationic acrylic polymer; water; and a. The cationic acrylic polymer may be present in an amount from 20 to 80 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The cationic acrylic polymer have hydroxyl functionality or may lack hydroxyl functionality. The formulation may further comprise a crosslinker, wherein the crosslinker may comprise a dispersible formulation of polyfunctional aziridines, isocyanates, melamine resins, epoxies, oxazolines, carbodiimides or other multifunctional crosslinkers. The crosslinker may be present in a range of about 1 to 5%, based on the total solids of the cationic acrylic polymer. The binder may be selected from the group consisting of polyvinyl alcohols (PVAs); modified polyvinyl alcohols; polysaccharides; polyurethane dispersions; acrylic copolymers; vinyl acetate copolymers; poly (vinyl pyrrolidone); vinyl pyrrolidone copolymers; poly(2-ethyl-2-oxazoline); poly(ethylene oxide); poly(ethylene glycol); poly(acrylic acids); starch; modified starch (e.g., oxidized starch, cationic starch, hydroxypropyl starch, and hydroxyethyl starch), cellulosic polymers oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose, hydroxypropyl methyl cellulose, hydroxy butylmethyl cellulose, dihydroxypropyl cellulose, hydroxypropyl hydroxyethyl cellulose, chlorodeoxycellulose, aminodeoxycellulose, diethylammonium chloride hydroxyethyl cellulose hydroxypropyl trimethyl ammonium chloride; hydroxyethyl cellulose; alginates and water-soluble gums; dextrans; carrageenan; xanthan; chitosan; proteins; gelatins; agar; and mixtures thereof. The binder may be present in an amount from 0.1 to 30 parts by weight, based on a total of 100 parts by weight. The cationic acrylic polymer may have at least one of the following properties: a) a hydroxyl value in range of about 65 to 80, b) an acid value in the range of about 6 to 14, c) a pH in the range of about 5 to 6.9, and d) a viscosity in the range of about 500 to about 800 cps. In some aspects, the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate. The binder may have a Tg in a range of about 90° C. to about 115° C.

In another embodiment, the disclosure is directed to a dried topcoat comprising a cationic acrylic polymer and a binder. The cationic acrylic polymer may be present in an amount from 50 to 95 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The cationic acrylic polymer have hydroxyl functionality or may lack hydroxyl functionality. The formulation may further comprise a crosslinker, wherein the crosslinker may comprise a dispersible formulation of polyfunctional aziridines, isocyanates, melamine resins, epoxies, oxazolines, carbodiimides or other multifunctional crosslinkers. The crosslinker may be present in a range of about 1 to 5%, based on the total solids of the cationic acrylic polymer. The binder may be selected from the group consisting of polyvinyl alcohols (PVAs); modified polyvinyl alcohols; polysaccharides; polyurethane dispersions; acrylic copolymers; vinyl acetate copolymers; polyvinyl pyrrolidone); vinyl pyrrolidone copolymers; poly(2-ethyl-2-oxazoline); polyethylene oxide); polyethylene glycol); poly(acrylic acids); starch; modified starch (e.g., oxidized starch, cationic starch, hydroxypropyl starch, and hydroxyethyl starch), cellulosic polymers oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose; hydroxypropyl methyl cellulose, hydroxy butylmethyl cellulose, dihydroxypropyl cellulose, hydroxypropyl hydroxyethyl cellulose, chlorodeoxycellulose, aminodeoxycellulose, diethylammonium chloride hydroxyethyl cellulose hydroxypropyl trimethyl ammonium chloride; hydroxyethyl cellulose; alginates and water-soluble gums; dextrans; carrageenan; xanthan; chitosan; proteins; gelatins; agar; and mixtures thereof. The binder may be present in an amount from 0.1 to 30 parts by weight, based on a total of 100 parts by weight. The cationic acrylic polymer may have at least one of the following properties: a) a hydroxyl value in range of about 65 to 80, b) an acid value in the range of about 6 to 14, c) a pH in the range of about 5 to 6.9, and d) a viscosity in the range of about 500 to about 800 cps. In some aspects, the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate. The binder may have a Tg in a range of about 90° C. to about 115° C. The dried top coat may be receptive to UV flexo printing, water-based flexographic printing, UV inkjet printing, thermal-transfer printing, direct thermal printing, digital printing, dry toner printing, liquid toner printing, laser printing cold foil printing. The dried topcoat may have a surface energy from 25 to 55 mN/m. The dried topcoat may be applied on paper or on a polymer layer, wherein the polymer layer is biaxially oriented poly propylene (BOPP), polypropylene (PP), polyethylene terephthalate (PET), polyethylene (PE), nylon, or polyvinylchloride (PVC) film. The dried topcoat may have a coat weight from 0.1 to 1.5 gsm.

In yet another embodiment, the disclosure is directed to a label comprising a substrate and a topcoat. The dried topcoat comprises a cationic acrylic polymer and a binder. The cationic acrylic polymer may be present in an amount from 50 to 95 parts by weight, based on a total of 100 parts by weight. The cationic acrylic polymer may be selected from the group consisting of an aliphatic cationic acrylate, an aromatic cationic acrylate, an aliphatic cationic methacrylate, and aromatic cationic methacrylate, and combinations thereof. The cationic acrylic polymer may have hydroxyl functionality or may lack hydroxyl functionality. The crosslinker may comprise a dispersible formulation of polyfunctional aziridines, isocyanates, melamine resins, epoxies, oxazolines, carbodiimides or other multifunctional crosslinkers. The formulation may further comprise a crosslinker, wherein the crosslinker may be present in a range of about 1 to 5%, based on the total solids of the cationic acrylic polymer. The binder may be selected from the group consisting of polyvinyl alcohols (PVAs); modified polyvinyl alcohols; polysaccharides; polyurethane dispersions; acrylic copolymers; vinyl acetate copolymers; polyvinyl pyrrolidone); vinyl pyrrolidone copolymers; poly(2-ethyl-2-oxazoline); polyethylene oxide); polyethylene glycol); poly(acrylic acids); starch; modified starch (e.g., oxidized starch, cationic starch, hydroxypropyl starch, and hydroxyethyl starch), cellulosic polymers oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose, hydroxypropyl methyl cellulose, hydroxy butylmethyl cellulose, dihydroxypropyl cellulose, hydroxypropyl hydroxyethyl cellulose, chlorodeoxycellulose, aminodeoxycellulose, diethylammonium chloride hydroxyethyl cellulose hydroxypropyl trimethyl ammonium chloride; hydroxyethyl cellulose; alginates and water-soluble gums; dextrans; carrageenan; xanthan; chitosan; proteins; gelatins; agar; and mixtures thereof. The binder may be present in an amount from 0.1 to 30 parts by weight, based on a total of 100 parts by weight. The cationic acrylic polymer may have at least one of the following properties: a) a hydroxyl value in range of about 65 to 80, b) an acid value in the range of about 6 to 14, c) a pH in the range of about 5 to 6.9, and d) a viscosity in the range of about 500 to about 800 cps. In some aspects, the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate. The binder may have a Tg in a range of about 90° C. to about 115° C. The dried top coat may be receptive to UV flexo printing, water-based flexographic printing, UV inkjet printing, thermal-transfer printing, direct thermal printing, digital printing, dry toner printing, liquid toner printing, laser printing cold foil printing. The dried topcoat may have a surface energy from 25 to 55 mN/m. The substrate may be a paper or on a polymer layer, wherein the polymer layer is biaxially oriented poly propylene (BOPP), polypropylene (PP), polyethylene terephthalate (PET), polyethylene (PE), nylon, or polyvinylchloride (PVC) film. The dried topcoat may have a coat weight from 0.1 to 1.5 gsm.

DETAILED DESCRIPTION OF THE INVENTION

A topcoat that is able to receive and retain print from a variety of printing techniques may be useful in providing a universal topcoat that may be applied to various labels and papers. The topcoats described herein adhere to most of the commonly used packaging & printing films, such as polyester, biaxially oriented polypropylene, polyethylene, polypropylene, polyvinyl chloride, nylon, and the like, and which retains print from various printing platforms, such as UV flexo, water based flexo, thermal transfer (TT) UV inkjet, cold foil, hot foil, letterpress, serigraphy, HP Indigo, offset, laser (cold as well as hot laser), and toner inks (including liquid and dry toner). The polymer layer may be clear or opaque (having a white face). It has now been discovered that the utilization of cationic acrylic polymers with a binder provides for unexpected performance properties of the resultant topcoat. For example, the use of a topcoat comprising a cationic acrylic polymer has been found to improve ink retention on the topcoat while also having sufficient adhesion of the topcoat to the film or paper to which it has been applied. The resultant topcoat may be coated onto polymer layers, such as films, or papers which are used in a variety of fields and may be referred to as a universal topcoat.

As explained herein, a problem in the art relates to inks or coatings failing to adhere to a substrate. Adhesion depends, to a great degree, on the surface energy of substrate or wet topcoat. Surface energy is related to the degree to which the surface can be wetted. Wetting indicates that the liquid, such as ink, will spread on the substrate surface. For ink to adhere to the surface, the ink must demonstrate good wetting, which occurs when the ink has a lower surface energy than the substrate. Thus, the substrate should have a greater surface energy than the print that it is intended to receive. For example, UV inks may generally have surface tensions (referred to as surface tension, because the ink is in liquid form) from 23 to 35 milinewtons per meter (mN/m). Solvent based inks, especially alcohol based inks, have a lower surface tension than UV inks. Water has a surface tension of about 72 mN/m and so water based inks generally have a greater surface tension, than UV based inks.

Although decreasing the surface tension of the print media is possible, it is more desirable to increase the surface energy of the substrate. One known method of achieving such an increase is a corona treatment, also referred to as air plasma treatment. Corona treatment, however, diminishes over time and may have to be repeated if the substrate is stored. The present inventors have surprisingly and unexpectedly discovered that the print adherence and retention may be improved by applying a wet topcoat comprising a cationic acrylic polymer, in combination with additional components, to the substrate. Advantageously, the surface energy of the wet topcoat comprising the cationic acrylic polymer does not diminish over time, while still achieving good adhesion of the wet topcoat to the substrate.

Wet Topcoat

As described herein the wet topcoat formulation (the topcoat formulation containing water prior to coating onto a substrate) is a water based topcoat that comprises a cationic acrylic polymer, water, and a binder. The wet topcoat may have a pH from 4 to 7, e.g., from 5 to 6, or of approximately 5.5. The solid content of the wet topcoat may range from 7.5 to 30%, e.g., from 10 to 25%.

In terms of lower limits, the wet topcoat may comprise at least 20 parts by weight of a cationic acrylic polymer, based on a total of 100 parts by weight, e.g., at least 30 parts by weight or at least 50 parts by weight. In terms of upper limits, the wet topcoat may comprise no more than 80 parts by weight of a cationic acrylic polymer, based on a total of 100 parts by weight, e.g., no more than 75 parts by weight, or no more than 70 parts by weight. In terms of ranges, the wet topcoat may comprise from 20 to 80 parts by weight of a cationic acrylic polymer, based on a total of 100 parts by weight, e.g., from 30 to 75 parts by weight, or from 50 to 70 parts by weight.

A "cationic acrylic polymer" refers to acrylic polymers that comprise cationic functional groups that impart a positive charge. The cationic acrylic polymer can be formed by any means known in that art. Suitable cationic acrylic polymers include, for example, copolymers of one or more alkyl esters of acrylic acid or methacrylic acid, optionally together with one or more other polymerizable ethylenically unsaturated monomers. Suitable alkyl esters of acrylic acid or methacrylic acid include, without limitation, methyl methacrylate, ethyl methacrylate, butyl methacrylate, ethyl acrylate, butyl acrylate, and 2-ethyl hexyl acrylate. Suitable other copolymerizable ethylenically unsaturated monomers include nitrites, such as acrylonitrile and methacrylonitrile, vinyl and vinylidene halides, such as vinyl chloride and vinylidene fluoride, and vinyl esters, such as vinyl acetate, among other monomers. Acid and anhydride functional ethylenically unsaturated monomers, such as acrylic acid, methacrylic acid or anhydride, itaconic acid, maleic acid or anhydride, or fumaric acid may be used. Amide functional monomers including, without limitation, acrylamide, methacrylamide, and N-alkyl substituted (meth)acrylamides are also suitable. Vinyl aromatic compounds, such as styrene and vinyl toluene, can also be used in certain cases.

Functional groups, such as hydroxyl and amino groups, can be incorporated into the acrylic polymer by using functional monomers, such as hydroxyalkyl acrylates and methacrylates or aminoalkyl acrylates and methacrylates. Epoxide functional groups (for conversion to cationic salt groups) may be incorporated into the acrylic polymer by using functional monomers, such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin, such as epichlorohydrin or dichlorohydrin.

In some aspects, the cationic acrylic polymer is selected from the group consisting of an aliphatic cationic acrylate, an aromatic cationic acrylate, an aliphatic cationic methacrylate, and aromatic cationic methacrylate, and combinations thereof. The cationic acrylic polymer may have hydroxyl functionality or may lack hydroxyl functionality. An exemplary cationic acrylic polymer is sold as Ottopol KX 63, sold by Gellner Industries, which is a mixture of high and low molecular weight polymer chains with a weight average molecular weight from 5 to 100 kDa. The cationic acrylic polymer may have hydroxyl functionality and may have a hydroxyl value from 65 to 80, e.g., from 67.5 to 77.5, or from 70 to 75. The cationic acrylic polymer may have an acid value from 6 to 14, e.g, from 8 to 12 or from 9 to 11. The pH of the cationic acrylic polymer may be acidic, e.g., from 5 to 6.9 or from 5.5 to 6. The viscosity of the cationic acrylic polymer may range from about 500 to about 800 cps with a solids content from 38-40%.

In some aspects, the formulation comprises a crosslinker, which may crosslink the cationic acrylic polymer. The crosslinker may be included in an amount from 1 to 5%, based on the total solids of the cationic acrylic polymer, e.g., from 2 to 4% or from 2.5 to 3.5%. The crosslinker may comprise a dispersible formulation of polyfunctional aziridines, isocyanates, melamine resins, epoxies, oxazolines, carbodiimides and other multifunctional crosslinkers. In some aspects, the crosslinker may be an epoxy resin, such as a multifunctional epoxy resin. Exemplary resins include epoxidized sorbitol (for example, sold as ERISYS® 60B and ERISYS® GE-60, sorbitol polyglycidyl ether (for example, sold as DENACOL® Ex-614B). Without being bound by theory, the epoxy resin is believed to crosslink the acrylic resins in the cationic acrylic polymer to provide for improved chemical resistance in light stable coatings.

In terms of lower limits, the wet topcoat may comprise at least 0.001 parts by weight surfactant, based on a total of 100 parts by weight, e.g., at least 0.01 parts by weight, or at least 0.025 parts by weight. In terms of upper limits, the wet topcoat may comprise at most 3 parts by weight surfactant, based on a total of 100 parts by weight, e.g., at most 1 parts by weight or at most 0.075 parts by weight. In terms of ranges, the wet topcoat may comprise from 0.001 to 3 parts by weight surfactant, based on a total of 100 parts by weight, e.g., from 0.01 to 1 parts by weight or from 0.025 to 0.075 parts by weight.

The surfactant may be a cationic surfactant or a nonionic surfactant. Non-limiting examples of nonionic surfactants include alkylphenol ethoxylates, such as nonylphenol ethoxylate, and Disponil A 3065, an ethoxylated nonionic surfactant available from Henkel of America Inc. (King of Prussia, Pa.). Examples of nonionic surfactants include TRITON X-100, TRITON X-102, TRITON X-114, TRITON X-101, and TRITON CF-10 surfactants (all available from Union Carbide Corp.); SURFYNOL CT-136 (which is actually a mixture of anionic and nonionic surfactants), SURFYNOL 104, SURFYNOL 465, and SURFYNOL TG surfactants (all available from Air Products and Chemicals of Allentown, Pa.); and Tergitol NP-9 and Tergitol NP-10 surfactants (both available from Union Carbide Chemicals and Plastics Co. of Danbury, Conn.). Surfynol 104 DPM is particularly useful because it also act to control foaming. A non-limiting example of a cationic surfactant useful in the practice of the invention is hexadecyl trimethylammonium chloride (HDTMAC), available from Akzo Nobel Chemicals Inc. (Chicago, Ill.).

In terms of lower limits, the wet topcoat may comprise at least 10 parts by weight water, based on a total of 100 parts by weight, e.g., at least 20 parts by weight or at least 30 parts by weight. In terms of upper limits, the wet topcoat may comprise no more than 60 parts by weight water, based on a total of 100 parts by weight, e.g., no more than 55 parts by weight, or no more than 50 parts by weight. In terms of ranges, the wet topcoat may comprise from 10 to 60 parts by weight water, based on a total of 100 parts by weight, e.g., from 20 to 55 parts by weight, or from 30 to 50 parts by weight. The water may be distilled water.

In terms of lower limits, the wet topcoat may comprise at least 0.1 parts by weight of a binder, based on a total of 100 parts by weight, e.g., at least 1 part by weight or at least 3 parts by weight. In terms of upper limits, the wet topcoat may comprise no more than 30 parts by weight of a binder, based on a total of 100 parts by weight, e.g., no more than 20 parts by weight, or no more than 10 parts by weight. In terms of ranges, the wet topcoat may comprise from 0.1 to 30 parts by weight of a binder, based on a total of 100 parts by weight, e.g., from 1 to 20 parts by weight, or from 3 to 10 parts by weight.

The binder may be included in the wet topcoat to help stabilize the wet topcoat once it is coated onto a substrate. The binder may also improve cohesion and mechanical integrity of the wet topcoat. The binder is typically are water-soluble or water-dispersible, especially when the ultimate application is aqueous-based ink jet printing, and include, for example, those selected from the group consisting of polyvinyl alcohols (PVAs); modified polyvinyl alcohols (e.g., carboxyl-modified PVA, silicone-modified PVA, maleic acid-modified PVA, and itaconic acid-modified PVA); polysaccharides; polyurethane dispersions; acrylic copolymers; vinyl acetate copolymers; poly(vinyl pyrrolidone); vinyl pyrrolidone copolymers; poly(2-ethyl-2-oxazoline); poly(ethylene oxide); poly(ethylene glycol); poly(acrylic acids); starch; modified starch (e.g., oxidized starch, cationic starch, hydroxypropyl starch, and hydroxyethyl starch), cellulosic polymers oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose, hydroxypropyl methyl cellulose, hydroxy butylmethyl cellulose, dihydroxypropyl cellulose, hydroxypropyl hydroxyethyl cellulose, chlorodeoxycellulose, aminodeoxycellulose, diethylammonium chloride hydroxyethyl cellulose, and hydroxypropyl trimethyl ammonium chloride hydroxyethyl cellulose); alginates and water-soluble gums; dextrans; carrageenan; xanthan; chitosan; proteins; gelatins; agar; and mixtures thereof. In some aspects, the binder is poly(vinyl pyrrolidone). In further aspects, the binder is a polyvinyl pyrrolidone/vinyl acetate copolymer (PVP/VA). The PVP/VA may have a weight ratio of vinyl pyrrolidone to vinyl acetate from 50:50 to 80:20 vinyl pyrrolidone to vinyl acetate, e.g., from 50:50 to 75:25. In some aspects, the weight ratio is 60:40 vinyl pyrrolidone to vinyl acetate. The PVP/VA may be a linear random copolymer. The PVP/VA may have a Tg of 90 to 115° C., e.g., from 95 to 110° C. or from 100 to 110° C.

The wet topcoat may further comprise at least one wax, such as a cationic wax. In terms of lower limits, the wet topcoat may comprise at least 0.1 parts by weight wax, based on a total of 100 parts by weight, e.g., at least 0.5 parts by weight or at least 1 part by weight. In terms of upper limits, the wet topcoat may comprise no more than 15 parts by weight wax, based on a total of 100 parts by weight, e.g., no more than 10 parts by weight, or no more than 5 parts by weight. In terms of ranges, the wet topcoat may comprise from 0.1 to 15 parts by weight wax, based on a total of 100 parts by weight, e.g., from 0.5 to 10 parts by weight, or from 1 to 5 parts by weight.

When included, the wax helps improve scratch resistance. In one embodiment, the particles in the wax are less than 5, or less than 0.5 microns in size. The melting point of the wax or of the mixture of waxes preferably ranges from 50-150° C. In addition, the particles in the microdispersion can contain a small amount of oily or pasty fatty additives, one or more surfactants and one or more common liposoluble active ingredients. The waxes include natural (animal or plant) or synthetic substances which are solid at room temperature (20-25° C.). In one embodiment, they are insoluble in water, soluble in oils and are capable of forming a water-repellent film. A definition of waxes is provided by, for example, P. D. Dorgan, Drug and Cosmetic Industry, December 1983, pp. 30-33. The wax(es) includes carnauba wax, candelilla wax and alfalfa wax, and mixtures thereof.

In addition to these waxes, the mixture of waxes can also contain one or more of the following waxes or family of waxes: paraffin wax, ozokerite, plant waxes, such as olive wax, rice wax, hydrogenated jojoba wax or the absolute waxes of flowers, such as the essential wax of blackcurrant flower sold by the company Bertin (France), animal waxes, such as beeswaxes or modified beeswaxes (cerabellina); other waxes or waxy starting materials; marine waxes, such as those sold by the company Sophim under the identifier M82; natural or synthetic ceramides, and polyethylene or polyolefin waxes in general. The carnauba (extract of *Copernica cerifera*), candelilla (extract of *Euphorbia cerifera* and of *Pedilantus pavonis*) and alfalfa (extract of *Stipa tenacissima*) plant waxes are commercial products. Examples of commercially available waxes are Aquacer 499, 520, 537, 608 available from Byk Cera. In some aspects, the wax may be a cationic wax, such as a cationic high density polyethylene wax.

The wet topcoat may further comprise at least one additive, also referred to as an additive package. In terms of lower limits, the wet topcoat may comprise at least 0.01 parts by weight of at least one additive, based on a total of 100 parts by weight, e.g., at least 0.05 parts by weight or at least 0.1 part by weight. In terms of upper limits, the wet topcoat may comprise no more than 5 parts by weight of at least one additive, based on a total of 100 parts by weight, e.g., no more than 1 parts by weight, or no more than 0.5 parts by weight. In terms of ranges, the wet topcoat may comprise from 0.01 to 5 parts by weight of at least one additive, based on a total of 100 parts by weight, e.g., from 0.05 to 1 part by weight, or from 0.1 to 0.5 parts by weight.

The at least one additive may be selected from the group consisting of waxes (in addition to the cationic wax disclosed herein), defoamers, anti-oxidants, UV stabilizers, fillers, anti-blocking agents and combinations thereof. In some aspects, the wet topcoat comprises at least two additives, e.g., at least three additives or at least four additives. In further aspects, the wet topcoat comprises a wax, a defoamer, and a filler as additives. In some aspects, a second wax and a filler may be included. The combination of these fillers may improve scuff and scratch resistance, as well as blocking and print receptivity, especially when a water-based print is used.

A second wax, in addition to the above described wax, may be included. The second wax may be a wax as described above, though different from the first wax. In some aspects, a non-ionic wax, such as a polyethylene terephthalate wax may be used.

When included, a defoaming agent generally reduces or mitigates the formation of foaming in the wet topcoat layer when deposited or generally handled or transferred from one location to another. Generally, any defoaming agent that does not interfere in some embodiments, desired loadings and/or physical or mechanical properties of the wet topcoat layer may be used. For instance, the defoaming agent may be mineral-based, silicone-based, or non-silicone-based.

Any suitable antioxidants for a particular embodiment may be used. In some embodiments, antioxidants may be selected that exhibit good heat resistance and mitigate the discoloration of polymeric-based articles/coatings. Exemplary antioxidants suitable for use according to certain embodiments of the present invention include, but not limited to, CHINOX 626, CHINOX 62S (organophophite antioxidant), CHINOX 245 (steric hindered phenolic antioxidant), and CHINOX 30N (blend of hindered phenolic antioxidants), each of which is commercially available from Double Bond Chemical Ind., Co., Ltd.

UV stabilizers include, but are not limited to hindered amine absorbers available from Ciba-Geigy under the trade designation Tinuvin, especially those available under the designations Tinuvin 234, Tinuvin 326, Tinuvin 327 and Tinuvin 328. The light stabilizers that can be used include the hindered amine light stabilizers available from Ciba-Geigy under the trade designations Tinuvin 111, Tinuvin 123, Tinuvin 622, Tinuvin 770 and Tinuvin 783. Also useful light stabilizers are the hindered amine light stabilizers available from Ciba-Geigy under the trade designation Chimassorb, especially Chimassorb 119 and Chimassorb 944.

Fillers include, but are not limited to metal oxides, talc, calcium carbonate, organo-clay, glass fibers, marble dust, cement dust, feldspar, silica or glass, fumed silica, silicates, alumina, various phosphorus compounds, ammonium bromide, titanium dioxide, antimony trioxide, antimony trioxide, zinc oxide, zinc borate, barium sulfate, silicones, aluminum silicate, calcium silicate, glass microspheres, chalk, mica, clays, wollastonite, ammonium octamolybdate, intumescent compounds and mixtures of two or more of these materials. The fillers may also carry or contain various surface coatings or treatments, such as silanes, fatty acids, and the like. Still other fillers can include flame retardants, such as the halogenated organic compounds. In certain embodiments, the wet topcoat layer may include one or more thermoplastic elastomers that are compatible with the other constituents of the layer, such as etherified melamine, hydroxylated polyester, polyester-melamine, and other suitable elastomers.

The additive may be an anti-blocking additive. These additives reduce the tendency of the film to stick together when it is in roll form. The anti-blocking additives include natural silica, diatomaceous earth, synthetic silica, glass spheres, ceramic particles, etc. Slip additives including primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bis-amides such as N, NN-ethylenebisstearamide, N, NN-ethylenebisolamide and the like; and combinations of any two or more of the foregoing amides can also be included.

Anti-freeze additives to protect the material from freezing may be included, as well as modified non-ionic polymeric compounds, modified quaternary ammonium polymeric compounds, and cationic salts. When included, these additive may be included from 0.01 to 1 part by weight, based on a total weight of 100, depending on requirements for performance and processing.

Wet Topcoat Preparation

The wet topcoat preparation depends on the components included. In embodiments where the wet topcoat includes a surfactant, the surfactant may first be combined with water and stirred. The binder may then be added to the water and surfactant mixture, and mixed. The binder may be added slowly under high agitation, e.g., from 500 to 1000 rpm. Mixing may occur in the presence of nitrogen purging or under vacuum to avoid microbubble formation during wet topcoat formation. The solution may then be allowed to settle, allowing for removal of any air bubbles. The solids content of the mixture may be calculated at this point. If needed, the solids content may be adjusted. Mixing may then restart. The speeds of mixing may be from 500 to 600 rpm. Next, the cationic acrylic polymer may be added to the mixture. When included, a wax may be added and the entire mixture may be stirred. If included, additives may then be added.

Dry Topcoat

As described above, the wet topcoat may be coated, e.g., onto a substrate, as a dry topcoat, also referred to herein simply as a topcoat. When coated as a dry topcoat, the water from the wet topcoat is evaporated. When included, the surfactant may also be evaporated when the topcoat is dried. Therefore, the components of the dry topcoat, e.g., at a minimum, the cationic acrylic polymer and the binder are present in different weight percentages as compared to the wet topcoat. Once coated onto a substrate, the surface energy of the dry topcoat may be at least 28 mN/m, e.g., at least 30 mN/m, or at least 30 mN/m. In terms of ranges, the surface energy may be from 25 to 55 mN/m, e.g., from 28 to 54 mN/m or from 30 to 50 mN/m.

In terms of lower limits, the dry topcoat may comprise at least 50 parts by weight of a cationic acrylic polymer, based on a total of 100 parts by weight, e.g., at least 60 parts by weight or at least 70 parts by weight. In terms of upper limits, the dry topcoat may comprise no more than 95 parts by weight of a cationic acrylic polymer, based on a total of 100 parts by weight, e.g., no more than 93 parts by weight, or no more than 90 parts by weight. In terms of ranges, the dry topcoat may comprise from 50 to 95 parts by weight of a cationic acrylic polymer, based on a total of 100 parts by weight, e.g., from 60 to 93 parts by weight, or from 70 to 90 parts by weight.

In terms of lower limits, the dry topcoat may comprise at least 0.005 parts by weight surfactant, based on a total of 100 parts by weight, e.g., at least 0.02 parts by weight, or at least 0.03 parts by weight. In terms of upper limits, the dry topcoat may comprise at most 3 parts by weight surfactant, based on a total of 100 parts by weight, e.g., at most 1 parts by weight or at most 0.09 parts by weight. In terms of ranges, the dry topcoat may comprise from 0.005 to 3 parts by weight surfactant, based on a total of 100 parts by weight, e.g., from 0.02 to 1 parts by weight or from 0.03 to 0.9 parts by weight.

In terms of lower limits, the dry topcoat may comprise at least 0.1 parts by weight of a binder, based on a total of 100 parts by weight, e.g., at least 3 part by weight or at least 5 parts by weight. In terms of upper limits, the dry topcoat may comprise no more than 40 parts by weight of a binder, based on a total of 100 parts by weight, e.g., no more than 30 parts by weight, or no more than 15 parts by weight. In terms of ranges, the dry topcoat may comprise from 0.1 to 40 parts by weight of a binder, based on a total of 100 parts by weight, e.g., from 3 to 30 parts by weight, or from 5 to 15 parts by weight.

The dry topcoat may further comprise at least one wax, such as a cationic wax. In terms of lower limits, the dry topcoat may comprise at least 0.1 parts by weight wax, based on a total of 100 parts by weight, e.g., at least 2 parts by weight or at least 3 parts by weight. In terms of upper limits, the dry topcoat may comprise no more than 20 parts by weight wax, based on a total of 100 parts by weight, e.g., no more than 15 parts by weight, or no more than 10 parts by weight. In terms of ranges, the dry topcoat may comprise from 0.1 to 20 parts by weight wax, based on a total of 100 parts by weight, e.g., from 2 to 15 parts by weight, or from 3 to 10 parts by weight.

The dry topcoat may further comprise at least one additive. In terms of lower limits, the dry topcoat may comprise at least 0.01 parts by weight of at least one additive, based on a total of 100 parts by weight, e.g., at least 0.1 parts by weight or at least 0.3 parts by weight. In terms of upper limits, the dry topcoat may comprise no more than 10 parts by weight of at least one additive, based on a total of 100 parts by weight, e.g., no more than 5 parts by weight, or no more than 1 part by weight. In terms of ranges, the dry topcoat may comprise from 0.01 to 10 parts by weight of at least one additive, based on a total of 100 parts by weight, e.g., from 0.1 to 5 parts by weight, or from 0.3 to 1 parts by weight.

The topcoat, prepared as described above, may be in the form of a wet topcoat solution that is then coated as a dry topcoat onto the desired substrate. The coat weight of the dry topcoat may vary, but is generally within the range from 0.1 to 1.5 grams per square meter ("gsm"), e.g., from 0.1 to 1.25 gsm or from 0.2 to 1 gsm. The substrate is generally a film (such as a polymer described herein), a label, paper, or a metal foil.

In some aspects, the topcoat is coated onto a label, which generally comprises a facestock layer. The facestock layer may be a polymer layer as described herein, such as a polyolefin film that is directly adjacent to the dry topcoat. The polyolefin film has top and bottom surfaces. From the perspective looking downwardly toward the substrate, the polyolefin film may be configured beneath the topcoat, e.g., the top surface of the polyolefin film is adjacent the topcoat. In some aspects, the polymer film is polyethylene, polypropylene, or polyethylene terephthalate.

The polyolefin film may vary widely. In some embodiments, the polyolefin film may comprise any polyolefin material that exhibits good mechanical strength and heat resistance. Exemplary polyolefin films may comprise at least one of a polyimide, a polyester, a polyetherimide (PEI), a polyethylene naphthalate (PEN), a polyether sulfone (PES), a polysulfone, polymethylpentene (PMP), a polyvinylidene fluoride (PVDF), an ethylene-chlorotrifluoroethylene (ECTFE), or combinations thereof. In certain embodiments, especially when the label may be used at high temperatures, the polyolefin film comprises at least one polyimide Exemplary polyolefin films made of polyimide include Kapton®, available from DuPont, and Apical©, available from Kaneka Texas Corporation, Exemplary polyolefin films made of polyester include Mylar©, available from DuPont, and 2600 polyethylene terephthalate film, available from American Hoechst. Other commercially available polyolefin films include Tempalux™ (PEI), available from Westlake Plastics Company; Superio-UT™ (PEI), available from Mitsubishi Plastics, Kaladex™; (PEN) and Teonex (PEN), both available from DuPont.

The polyolefin films according to certain embodiments of the present invention may comprise a thickness ranging from 1 to 400 microns, e.g., from 10 to 300 microns, from 25 to 200 microns, or from 50 to 150 microns, and other ranges in the foregoing amounts. In terms of lower limits, the polyolefin films may have a thickness of at least 1 micron, e.g., at least 10 microns, at least 25, or at least 50 microns and may exceed 300 microns. In terms of upper limits, the polyolefin films may have a thickness less than 400 microns, e.g., less than 300 microns, less than 200 microns, or less than 150 microns.

In some aspects, the label may further comprise a primer layer. The primer layer may be directly adjacent to the polyolefin film on the opposite surface of the polyolefin film from the topcoat, e.g., the polyolefin film may be configured between the topcoat and the primer layer. The primer layer may comprise a crosslinker and optionally may include additives as disclosed for the topcoat. The primer layer may be coated onto the polyolefin film by gravure. After curing at a temperature from about 150 to 180° C., the primer is affixed to the film. Additionally, when crosslinker is included in the primer layer, the hydroxyl group on the polyolefin film with react with the crosslinker and thus the primer layer is chemically bonded to the polyolefin film.

The thickness of the primer layer may range from 0.01 to 50 microns, e.g., from 0.1 to 25 microns, or from 0.5 to 10 microns. In terms of lower limits, the primer layer may have a thickness of at least 0.01 micron, e.g., at least 0.1 microns, or at least 0.5 micros. In terms of upper limits, the primer layer may have a thickness less than 50 microns, e.g., less than 25 microns, or less than 10 microns.

The label may further comprise an adhesive layer. The adhesive layer may comprise any adhesive that is effective in binding the label to an external surface of the substrate to which the label may be affixed. In some aspects, the adhesive may be a pressure sensitive adhesive. An aggressive pressure sensitive adhesive may be used, such as one of the high-strength or rubber-modified acrylic pressure sensitive adhesives, such as Duro-Tak® 80-115 A available from National Starch and Chemical Co. or Aroset™ 1860-Z-45 available from Ashland Specialty Chemical Company. Suitable pressure sensitive adhesives may include, for example, copolymers of alkyl acrylates that have a straight chain of from 4 to 12 carbon atoms and a minor proportion of a highly polar copolymerizable monomer such as acrylic acid. These adhesives are more fully described in U.S. Pat. Re. 24,906 and U.S. Pat. No. 2,973,286, the contents of each are hereby incorporated by reference in their entirety. Alternative pressure sensitive adhesives include ultraviolet curable pressure sensitive adhesives, such as Duro-Tak 4000, which is available from National Starch and Chemical Co.

The label may further comprise a releasable liner. The releasable liner may be positioned directly adjacent to the adhesive layer, on the opposite side of the adhesive layer from the primer layer. In this regard, the releasable liner may protect the adhesive layer before the label is applied (or intended to be applied) to an object or facestock, such as during manufacture, printing, shipping, storage, and at other times. Any suitable material for a releasable liner may be used. Typical and commercially available releasable liners, which can be suitable for embodiments of the present invention, can include a silicone-treated release paper or film, such as those available from Loparex, including products such as 1011, 22533 and 1 1404, CP Films, and Akrosil™.

Each of the layers of the label may also contain additives in amounts as described herein, including antioxidants and cross-linkers.

In further embodiments, the wet topcoat may be coated onto paper, such as cast gloss paper. The topcoat disclosed herein beneficially exhibits good adhesion to cast gloss paper. The coat weight of the topcoat may vary, but is generally within the range from 0.1 to 1.5 grams per square meter ("gsm"), e.g., from 0.1 to 1.25 gsm or from 0.2 to 1 gsm. The coat weight of the topcoat may be adjusted if a specific range for the coat weight or solids content is desired. Generally, a greater coat weight and solids content are desired for a topcoat coated onto paper as compared to a topcoat coated onto a polyolefin film.

The following embodiments are contemplated. All combinations of features and embodiments are contemplated.

Embodiment 1

A topcoat comprising: (i) a cationic acrylic polymer; (ii) a surfactant; (iii) a binder, and (iv) an additive package.

Embodiment 2

An embodiment of embodiment 1, wherein the cationic acrylic polymer is present in an amount from 50 to 95 parts by weight, based on a total of 100 parts by weight.

Embodiment 3

An embodiment of any one of the embodiments of embodiments 1-2, wherein the cationic acrylic polymer is selected from the group consisting of an aliphatic cationic acrylate, an aromatic cationic acrylate, an aliphatic cationic methacrylate, and aromatic cationic methacrylate, and combinations thereof.

Embodiment 4

An embodiment of any one of the embodiments of embodiments 1-3, wherein the topcoat further comprises a crosslinker.

Embodiment 5

An embodiment of any one of the embodiments of embodiments 1-4, wherein the surfactant is present in an amount from 0.005 to 3 parts by weight, based on a total of 100 parts by weight.

Embodiment 6

An embodiment of any one of the embodiments of embodiments 1-5, wherein the binder is present in an amount from 0.1 to 30 parts by weight, based on a total of 100 parts by weight.

Embodiment 7

An embodiment of any one of the embodiments of embodiments 1-6, wherein the topcoat further at least one additive.

Embodiment 8

An embodiment of any one of the embodiments of embodiments 1-7, wherein the topcoat comprises at least one additive present in an amount from 0.01 to 10 parts by weight, based on a total of 100 parts by weight.

Embodiment 9

An embodiment of any one of the embodiments of embodiments 1-8, wherein the topcoat further comprises at least one additive selected from the group consisting of waxes, defoamers, anti-oxidants, UV stabilizers, fillers, anti-blocking agents, and combinations thereof.

Embodiment 10

An embodiment of any one of the embodiments of embodiments 1-9, wherein the topcoat further comprises a metal oxide.

Embodiment 11

An embodiment of any one of the embodiments of embodiments 1-10, wherein the topcoat further comprises at least one wax.

Embodiment 12

An embodiment of any one of the embodiments of embodiments 1-11, wherein the topcoat further comprises at least one wax present in an amount from 0.1 to 15 parts by weight, based on a total of 100 parts by weight.

Embodiment 13

An embodiment of any one of the embodiments of embodiments 1-12, wherein the topcoat has a surface energy of at least 30 mN/m.

Embodiment 14

A coated paper comprising: (a) a paper; and (b) a wet topcoat according to any of embodiments 1-13.

Embodiment 15

An embodiment of embodiment 14, wherein the topcoat is coated onto the paper in a coat weight from 0.1 to 1.5 gsm.

Embodiment 16

A label comprising: (a) a substrate; and (b) a topcoat according to any embodiments 1-13 in contact with the substrate.

Embodiment 17

An embodiment of embodiment 16, wherein the topcoat is coated onto the label in a coat weight from 0.1 to 1.5 gsm.

Embodiment 18

An embodiment of any one of the embodiments of embodiments 16-17, wherein the substrate comprises a film and wherein a top surface of the film is in contact with the topcoat.

Embodiment 19

An embodiment of embodiment 18, wherein the film is a polyolefin film comprising a material selected from the group consisting of a polyimide, a polyester, a polyetherimide (PEI), a polyethylene naphthalate (PEN), a polyether sulfone (PES), a polysulfone, polymethylpentene (PMP), a polyvinylidene fluoride (PVDF), an ethylene-chlorotrifluoroethylene (ECTFE), or combinations thereof.

Embodiment 20

An embodiment of any one of the embodiments of embodiments 18-19, wherein the substrate further comprises an adhesive layer, wherein a top surface of the adhesive layer is in contact with a bottom surface of the film.

Embodiment 21

An embodiment of embodiment 20, wherein the substrate further comprises a release liner in contact with a bottom surface of the adhesive layer.

Embodiment 22

An embodiment of embodiment 21, wherein the adhesive layer comprises a pressure sensitive adhesive.

Embodiment 23

A water-based wet topcoat comprising: (i) a cationic acrylic polymer; (ii) a surfactant; (iii) water; and (iv) a binder.

Embodiment 24

An embodiment of embodiment 23, wherein the cationic acrylic polymer is present in an amount from 20 to 80 parts by weight, based on a total of 100 parts by weight.

Embodiment 25

An embodiment of any one of the embodiments of embodiments 23-24, wherein the cationic acrylic polymer is selected from the group consisting of an aliphatic cationic acrylate, an aromatic cationic acrylate, an aliphatic cationic methacrylate, and aromatic cationic methacrylate, and combinations thereof.

Embodiment 26

An embodiment of any one of the embodiments of embodiments 23-25, wherein the surfactant is present in an amount from 0.001 to 5 parts by weight, based on a total of 100 parts by weight.

Embodiment 27

An embodiment of any one of the embodiments of embodiments 23-26, wherein the water is present in an amount from 10 to 60 parts by weight, based on a total of 100 parts by weight.

Embodiment 27

An embodiment of any one of the embodiments of embodiments 23-26, wherein the binder is present in an amount from 0.1 to 30 parts by weight, based on a total of 100 parts by weight.

Embodiment 28

An embodiment of any one of the embodiments of embodiments 23-27, wherein the wet topcoat further at least one additive.

Embodiment 29

An embodiment of any one of the embodiments of embodiments 23-28, wherein the wet topcoat comprises at least one additive present in an amount from 0.01 to 20 parts by weight, based on a total of 100 parts by weight.

Embodiment 30

An embodiment of any one of the embodiments of embodiments 23-29, wherein the wet topcoat further comprises at least one additive selected from the group consisting of waxes, defoamers, anti-oxidants, UV stabilizers, fillers, anti-blocking agents, and combinations thereof.

Embodiment 31

An embodiment of any one of the embodiments of embodiments 23-30, wherein the wet topcoat further comprises a metal oxide.

Embodiment 32

An embodiment of any one of the embodiments of embodiments 23-31, wherein the wet topcoat further comprises at least one wax.

Embodiment 33

An embodiment of any one of the embodiments of embodiments 23-32, wherein the wet topcoat further comprises at least one wax present in an amount from 1 to 15 parts by weight, based on a total of 100 parts by weight.

Embodiment 34

An embodiment of any one of the embodiments of embodiments 23-33, wherein the wet topcoat has a surface energy of at least 30 mN/m.

Embodiment 35

A water based top coat formulation comprising: a cationic acrylic polymer; water; and at least one of a binder and a crosslinker.

Embodiment 36

Any embodiment of embodiment 35, wherein the cationic acrylic polymer is present in an amount from 20 to 80 parts by weight, based on a total of 100 parts by weight Embodiment 37

Any embodiments of any one of the embodiments of embodiments 35-36, wherein the cationic acrylic polymer is selected from the group consisting of an aliphatic cationic acrylate, an aromatic cationic acrylate, an aliphatic cationic methacrylate, and aromatic cationic methacrylate, and combinations thereof.

Embodiment 38

Any embodiments of any one of the embodiments of embodiments 35-37, wherein the cationic acrylic polymer has hydroxyl functionality.

Embodiment 39

Any embodiments of any one of the embodiments of embodiments 35-38, wherein formulation further comprises a crosslinker, and wherein the crosslinker comprises a dispersible formulation of polyfunctional aziridines, isocyanates, melamine resins, epoxies, oxazolines, carbodiimides or other multifunctional crosslinkers.

Embodiment 39

Any embodiments of any one of the embodiments of embodiments 35-38, wherein the crosslinker is present in a range of about 1 to 5%, based on the total solids of the cationic acrylic polymer.

Embodiment 40

Any embodiments of any one of the embodiments of embodiments 35-39, wherein the binder is selected from the group consisting of polyvinyl alcohols (PVAs); modified polyvinyl alcohols; polysaccharides; polyurethane dispersions; acrylic copolymers; vinyl acetate copolymers; poly(vinyl pyrrolidone); vinyl pyrrolidone copolymers; poly(2-ethyl-2-oxazoline); poly(ethylene oxide); poly(ethylene glycol); poly(acrylic acids); starch; modified starch (e.g., oxidized starch, cationic starch, hydroxypropyl starch, and hydroxyethyl starch), cellulosic polymers oxidized cellulose, cellulose ethers, cellulose esters, methyl cellulose, hydroxyethyl cellulose, carboxymethyl-cellulose, benzyl cellulose, phenyl cellulose, hydroxypropyl cellulose, ethyl hydroxyethyl cellulose, hydroxyethyl methyl cellulose, hydroxypropyl methyl cellulose, hydroxy butylmethyl cellulose, dihydroxypropyl cellulose, hydroxypropyl hydroxyethyl cellulose, chlorodeoxycellulose, aminodeoxycellulose, diethylammonium chloride hydroxyethyl cellulose hydroxypropyl trimethyl ammonium chloride; hydroxyethyl cellulose; alginates and water-soluble gums; dextrans; carrageenan; xanthan; chitosan; proteins; gelatins; agar; and mixtures thereof.

Embodiment 41

Any embodiments of any one of the embodiments of embodiments 35-40, wherein the binder is present in an amount from 0.1 to 30 parts by weight, based on a total of 100 parts by weight.

Embodiment 42

Any embodiments of any one of the embodiments of embodiments 35-41, wherein the cationic acrylic polymer at least one of the following properties: a) a hydroxyl value in range of about 65 to 80, b) an acid value in the range of about 6 to 14, c) a pH in the range of about 5 to 6.9, and d) a viscosity in the range of about 500 to about 800 cps.

Embodiment 43

Any embodiments of any one of the embodiments of embodiments 35-42, wherein the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate.

Embodiment 44

Any embodiments of any one of the embodiments of embodiments 35-43, wherein the binder has a Tg in a range of about 90° C. to about 115° C.

Embodiment 45

A dried topcoat according to any one of the embodiments of embodiments 35-44.

Embodiment 46

Any embodiments according to embodiment 45, wherein the top coat is receptive to printing of UV flexographic printing, water-based flexographic printing, UV inkjet printing, thermal-transfer printing, direct thermal printing, digital printing, dry toner printing, liquid toner printing, laser printing cold foil printing.

Embodiment 47

Any embodiments of any one of the embodiments of embodiments 45-46, wherein the topcoat has a surface energy from 25 to 55 mN/m.

Embodiment 48

Any embodiments of any one of the embodiments of embodiments 45-47, wherein the topcoat is applied on paper or on a polymer layer, wherein the polymer layer is biaxially oriented poly propylene (BOPP), polypropylene (PP), polyethylene terephthalate (PET), polyethylene (PE), nylon, or polyvinylchloride (PVC) film.

Embodiment 49

Any embodiments of any one of the embodiments of embodiments 45-48, wherein the topcoat has a coat weight from 0.1 to 1.5 gsm.

Embodiment 50

A label comprising a substrate and the dried topcoat according to any of embodiments 45-49.

The present invention will be better understood in view of the following non-limiting examples.

EXAMPLES

Formulation A

A cationic based wet topcoat solution was prepared as follows:

0.025 parts of surfactant (BYK 348) were added to 33.95 parts water and stirred for 5 minutes. To this mixture, 7 parts of PVP polymer (Luviskol VA 64 P) were added and the mixture was stirred for 30 minutes. 56 parts cationic acrylic polymer without hydroxyl functionality, 3 parts of cationic HDPE wax emulsion, and 0.025 parts defoamer were then added to the mixture and the mixture was stirred for 10 minutes.

Coated Film Preparation A

Formulation A was then coated on corona treated white polypropylene film and dried at 110° C. for 5 minutes. Formulation A was coated onto the film with a coat weight from 0.2 to 0.3 grams per square meter (gsm).

The surface energy of the coated film was measured using a Kruss Drop Shape Analyzer 100. The analysis was conducted using water and tricresyl phosphate. The surface energy was 46.21 mN/m.

Example 1

The coated film A prepared above was subjected to printing with UV flexi proof 100 using Sericol cyan ink. The sample was printed at 40 m/minute. The sample was cut into a 12.5×10 cm rectangle and mounted on the printing press. Ink anchorage was evaluated immediately after printing by applying Scotch tape 810 to the printed surface, leaving the tape for 30 seconds, and pulling the tape off as fast as possible at a 180° angle to check the ink anchorage. The result is shown in Table 1 below.

Example 2

A sample was prepared and tested as in Example 1, except that the sample was printed at a speed of 80 m/min. The result is shown in Table 1 below.

Example 3

A sample was prepared and tested as in Example 1, except that the sample was printed at a speed of 99 m/min. The result is shown in Table 1 below.

Comparative Example A

A corona treated white polypropylene film was tested as described in Example 1. The result is shown in Table 1 below.

Comparative Example B

A corona treated white polypropylene film was tested as described in Example 2. The result is shown in Table 1 below.

Comparative Example C

A corona treated white polypropylene film was tested as described in Example 3. The result is shown in Table 1 below.

A test result of "pass" indicated that ink was not removed from the sample during testing. A test result of "fail" indicated that ink was removed from the sample during testing.

TABLE 1

Ink Anchorage After UV Printing at Different Speeds

| Example | Pass/Fail |
| --- | --- |
| Example 1 | Pass |
| Comparative Example A | Fail |
| Example 2 | Pass |
| Comparative Example B | Fail |
| Example 3 | Pass |
| Comparative Example C | Fail |

As shown in Table 1, ink was anchored to the wet topcoat comprising a cationic acrylic polymer at all tested printing speeds. The comparative examples without the cationic acrylic polymer failed the ink anchorage testing regardless of printing speed.

Example 4

Formulation A was coated onto a white PET film and dried for 5 minutes at 110° C. Formulation A was coated onto the film with a coat weight of 0.97 gsm. The coated film was subjected to printing with UV flexi proof 100 using Sericol cyan ink. The sample was printed at 99 m/minute. The sample was cut into a 8.5×11 cm rectangle and mounted on the printing press. Ink anchorage was evaluated immediately after printing by applying Scotch tape 810 to the printed surface, leaving the tape for 30 seconds, and pulling the tape off as fast as possible at a 180° angle to check the ink anchorage. The result is shown in Table 2 below.

Example 5

Formulation A was coated and tested as in Example 4, except that the coat weight was 0.82 gsm. The result is shown in Table 2 below.

Comparative Example D

A wet topcoat comprising at least one water dispersible aliphatic polyether-polyurethane and water dispersible silica particles was coated onto a white PET film and dried for 5 minutes at 110° C. The wet topcoat was coated onto the film with a coat weight of 1 gsm. The coated film was subjected to printing with UV flexi proof 100 using Sericol cyan ink. The sample was printed at 99 m/minute. The sample was cut into a 8.5×11 cm rectangle and mounted on the printing press. Ink anchorage was evaluated immediately after printing by applying Scotch tape 810 to the printed surface, leaving the tape for 30 seconds, and pulling the tape off as fast as possible at a 180° angle to check the ink anchorage. The result is shown in Table 2 below.

TABLE 2

Ink Anchorage With Different Coat Weights and Wet topcoats

| Example | Pass/Fail |
|---|---|
| Example 4 | Pass |
| Example 5 | Pass |
| Comparative Example D | Fail |

As shown in Table 2, both wet topcoats comprising a cationic acrylic polymer passed the ink anchorage test, whereas the comparative example failed the test.

Example 6

A coated film was prepared as in Example 4. The coated film was subjected to thermal transfer printing with a ZM 400 (Zebra) printer by using B 110 CR (Ricoh) resin ribbon at 4 inches per second at 25 darkness. Three different types of barcodes printed: a fine barcode, a normal barcode, and a 2D barcode. The adherence of the printing was rated from 0 to 4, with 0 being poor, 2 being acceptable, and 4 being good. The samples were also subjected to abrasion resistance testing with a rub time of 100 seconds in accordance with AATCC Test method 8 (also known as ISO Test Method 105-X12), IPA resistance testing with a rub time of 25 seconds in accordance with AATCC Test method 8, and scuff resistance for 100 cycles using a scuff resistance tester at 2 psi. The results are shown in Table 3.

Example 7

A coated film was prepared as in Example 4 and was tested as in Example 6. The results are shown in Table 3.

Comparative Example E

A coated film was prepared as in Comparative Example D and was tested as in Example 6. The results are shown in Table 3.

TABLE 3

Thermal Transfer Printing Testing

|  | Example 6 | Example 7 | Comparative Example E |
|---|---|---|---|
| Fine barcode (grade) | 0 | 0 | 0 |
| Normal barcode (grade) | 4 | 4 | 4 |
| 2D barcode (grade) | 3 | 3 | 3 |
| Abrasion resistance (grade) | 4 | 4 | 3.6 |
| IPA resistance (number of cycles before failure) | 25 | 25 | 25 |
| Scuff resistance (100 cycles) Pass/Fail | Pass | Pass | Fail |

A shown in Table 3, the coated films with cationic acrylic polymers in the wet topcoat had above acceptable results in all categories, and superior abrasion resistance to a wet topcoat without a cationic acrylic polymer.

Base Formulation B

A cationic based wet topcoat solution was prepared by combining 1.25 parts PVP-VA copolymer with 59.75 parts water and 30 parts cationic acrylic polymer. The cationic acrylic polymer without hydroxyl functionality, 40% solids, a pH from 5 to 6, a Tg of 10° C., a viscosity from 500-1500 cps, had a specific gravity of 1.04, and was an emulsion polymer.

Base Formulation C

A cationic based wet topcoat solution was prepared as in Formulation B except that the cationic acrylic polymer had hydroxyl functionality.

Base Formulation D

A cationic based wet topcoat solution was prepared as in Formulation C except that 0.6 parts multifunctional epoxy resin (polyglycidyl sorbitol ester) was included.

Examples 8-16

To test various printing platforms on various films, base formulations B-D were printed coated at a printing speed from 80-150 MPM at a GSM after coating of 0.4. The results are shown below in Table 4. The films were polypropylene (PP), polyethylene (PE), and polyethylene terephthalate (PET). The printing platforms are shown below.

"P" indicates "pass," means that the topcoated label passed the immediate print test, had good ink receptivity, and good ink layout according to visual inspection. The tape test is conducted immediately after printing by applying a 3M 810 tape to the printed surface. The tape is left on the printed surface for 30 seconds and then pulled off at a 120° angle. The tape is then visually inspected to see if any ink is transferred to the tape or if any adhesive from the tape is transferred to the printed surface. The test is then conducted with a 3M 600 tape to check for ink or adhesive transfer. "F" indicates "fail," meaning that ink or adhesive was transferred.

TABLE 5

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Wet topcoat Formulation | B | B | B | C | C | C | D | D | D |
| Film | PP | PE | PET | PP | PE | PET | PP | PE | PET |
| Low ink deposition (single color printing) with no overlapping inks | | | | | | | | | |
| UV flexo | P | P | P | P | P | P | P | F | F |
| WB flexo | P | P | P | P | P | P | P | F | F |
| TT | P | P | P | P | P | P | P | F | F |
| UV inkjet | P | P | P | P | P | P | P | F | F |

TABLE 5-continued

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Cold Foil | P | P | P | P | P | P | P | F | F |
| Hot Foil | P | P | P | P | P | P | P | F | F |
| Letterpress | P | P | P | P | P | P | P | F | F |
| Serigraphy | P | P | P | P | P | P | P | F | F |
| High ink deposition (multiple color printing) with overlapping inks ||||||||||
| UV flexo | F | F | F | F | P | P | P | F | F |
| WB flexo | F | F | F | F | P | P | P | F | F |
| TT | F | F | F | F | P | P | P | F | F |
| UV inkjet | F | F | F | F | P | P | P | F | F |
| Cold Foil | F | F | F | F | P | P | P | F | F |
| Hot Foil | F | F | F | F | P | P | P | F | F |
| Letterpress | F | F | F | F | P | P | P | F | F |
| Serigraphy | F | F | F | F | P | P | P | F | F |

While the invention has been described in detail, modifications within the spirit and scope of the invention will be readily apparent to those of skill in the art. It should be understood that aspects of the invention and portions of various embodiments and various features recited herein and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

What is claimed is:

1. A water based print receptive top coat formulation, said water based print receptive top coat formulation coat comprising:
   i) a cationic acrylic polymer having a hydroxyl value in the range of 65 to 80;
   ii) water; and
   iii) a binder;
   wherein the cationic acrylic polymer is present in an amount from 20 to 80 parts by weight, based on a total of 100 parts by weight of the water based print receptive top coat formulation;
   wherein the water based print receptive top coat formulation adheres to paper, polyester, biaxially oriented polypropylene, polyethylene, polypropylene, polyvinyl chloride, nylon, and the like, and which retains print from UV flexo, water based flexo, thermal transfer (TT) UV inkjet, cold foil, hot foil, letterpress, serigraphy, HP Indigo, offset, cold laser, hot laser, liquid toner inks, and dry toner inks;
   wherein the binder is present in an amount from 0.1 to 30 parts by weight, based on a total of 100 parts by weight of the water based print receptive top coat formulation; and
   wherein the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate, and the binder has a Tg of 90 to 115° C.

2. The water based print receptive top coat formulation according to claim 1, wherein the cationic acrylic polymer is selected from the group consisting of an aliphatic cationic acrylate, an aromatic cationic acrylate, an aliphatic cationic methacrylate, and aromatic cationic methacrylate, and combinations thereof.

3. The water based print receptive top coat formulation according to claim 1, wherein the formulation further comprises a crosslinker, and wherein the crosslinker comprises a dispersible formulation of polyfunctional aziridines, isocyanates, melamine resins, epoxies, oxazolines, carbodiimides or other multifunctional crosslinkers.

4. The water based print receptive top coat formulation according to claim 1, wherein the formulation further comprises a crosslinker, and wherein the crosslinker is present in a range of about 1 to 5%, based on the total solids of the cationic acrylic polymer.

5. The water based print receptive top coat formulation according to claim 1, wherein the cationic acrylic polymer has an acid value in the range of about 6 to 14.

6. The water based print receptive top coat formulation according to claim 1, wherein the cationic acrylic polymer has a pH in the range of about 5 to 6.9.

7. The water based print receptive top coat formulation according to claim 1, wherein the cationic acrylic polymer has a viscosity in the range of about 500 to about 800 cps.

8. A dried top coat formed from the water based print receptive top coat formulation according to claim 1.

9. The dried top coat according to claim 8, wherein the dried top coat has a surface energy from 25 to 55 mN/m.

10. The dried top coat according to claim 8, wherein the dried top coat has a coat weight from 0.1 to 1.5 gsm.

11. A label comprising a substrate and the dried top coat according to claim 8.

12. A water based print receptive top coat formulation, said water based print receptive top coat formulation consisting of:
   i) a cationic acrylic polymer having a hydroxyl value in the range of 65 to 80;
   ii) water;
   iii) a binder;
   iv) optionally a crosslinker;
   v) optionally a surfactant;
   vi) optionally a cationic wax; and
   vii) optionally one or more additives selected from the group consisting of defoaming agents, antioxidants, UV stabilizers, fillers, anti-blocking agents, and anti-freeze additives;
   wherein the cationic acrylic polymer is present in an amount from 20 to 80 parts by weight, based on a total of 100 parts by weight of the water based print receptive top coat formulation;
   wherein the water based print receptive top coat formulation adheres to paper, polyester, biaxially oriented polypropylene, polyethylene, polypropylene, polyvinyl chloride, nylon, and the like, and which retains print from UV flexo, water based flexo, thermal transfer (TT) UV inkjet, cold foil, hot foil, letterpress, serigraphy, HP Indigo, offset, cold laser, hot laser, liquid toner inks, and dry toner inks;
   wherein the binder is present in an amount from 0.1 to 30 parts by weight, based on a total of 100 parts by weight of the water based print receptive top coat formulation;
   wherein the binder is polyvinyl pyrrolidone/vinyl acetate copolymer (PVP/VA) having a weight ratio of vinyl pyrrolidone to vinyl acetate in a range of about 50:50 to about 80:20 vinyl pyrrolidone to vinyl acetate, and the binder has a Tg of 90 to 115° C.

* * * * *